Patented July 24, 1928.

1,678,175

UNITED STATES PATENT OFFICE.

ROGER ADAMS, OF URBANA, ILLINOIS; CARL R. NOLLER, OF ST. LOUIS, MISSOURI; AND JAMES A. ARVIN, OF URBANA, ILLINOIS, ASSIGNORS TO ABBOTT LABORATORIES, OF NORTH CHICAGO, ILLINOIS, A CORPORATION OF ILLINOIS.

CYCLOPENTENYL SUBSTITUTED ALIPHATIC ACIDS.

No Drawing.   Application filed July 9, 1927.   Serial No. 204,658.

The invention relates to certain racemic aliphatic acids and their derivatives in which the omega carbon atom is substituted by a delta-2-cyclopentenyl group. The acids and their derivatives which have been prepared and which have been found useful in medicine, particularly in the treatment of diseases produced by B. Leprae or B. Tuberculoci, have the general formula

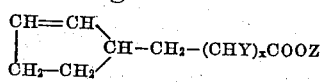

in which Y represents a monovalent atom or group, such as hydrogen, hydroxyl, halogen, carboxyl, etc.; X represents one or more; and Z represents hydrogen or a substituted hydrogen, such as a metal or an alkyl group.

These compounds are optically inactive, as the dextro and levo-rotatory forms are produced in equal amounts by the synthesis, giving rise in the case of each compound to a racemic modification.

A number of available methods may be employed for the preparation of these compounds; to serve as illustrations, a few applicable methods for certain members of the series are described. The acids containing from 2 to 8 carbons inclusive in the side chain may be prepared by the malonic ester synthesis. For example, cyclopentenyl ethyl bromide is converted into the Grignard derivative and treated with aldehydo-octanoate to give the hydroxy d-1-hydnocarpic acid ester. Another method which may be employed for the synthesis of a lower member of the series, as cyclopentenyl butanoic acid, consists in condensing cyclopentenyl ethyl bromide with monosodium malonic ester, and heating to eliminate carbon dioxide.

EXAMPLES.

Methyl hydroxy d-1-hydnocarpate.

Cyclopentenyl ethyl bromide may be prepared as follows:— A solution of 62.5 gr. of cyclopentenyl ethanol in 150 cc. dry toluene is cooled to −5° C. and a solution of 50 g. of redistilled phosphorus tribromide in 100 cc. toluene run in, keeping the temperature below 0° C. The mixture is then allowed to warm to room temperature and finally heated on the steam bath for one hour. Cool, pour into water, dry the toluene layer, and distill. The cyclopentenyl ethyl bromide so obtained boils at 71-72° C. (uncorr.) under 16 mm. pressure.

A dry ether solution of 157.5 grams cyclopentenyl ethyl bromide is converted into cyclopentenyl ethyl magnesium bromide, and the Grignard reagent diluted with dry ether to 1200 cc. This product is condensed with 186 grams of methyl 8-aldehydo-octanoate, and the resulting product decomposed with water. Methyl 9-hydroxy d-1-hydnocarpate is thus obtained as an oil, which boils at 177–179° (uncorr.) at 2 mm.

9-hydroxy d-1-hydnocarpic acid.

The above ester may be saponified by alcoholic potassium hydroxide to 9-hydroxy d-1-hydnocarpic acid, which, after recrystallization from acetone, melts at 62.0–62.8° C. (corr.).

Cyclopentenyl ethyl malonic ester.

Sodium ethyl malonate is prepared in absolute alcohol from 30 grams of malonic ester and 4.5 grams of sodium. The mixture is allowed to cool and 20 grams of cyclopentenyl ethyl bromide is added with stirring. The mixture is refluxed with stirring for twelve hours, the alcohol distilled off, water added, and the ester layer is dried and distilled. It boils at 147-8° C. at 4 mm. pressure.

Cyclopentenyl ethyl malonic acid.

When the above ester is saponified with aqueous sodium hydroxide solution, and the acid obtained therefrom recrystallized from benzene, there is obtained cyclopentenyl ethyl malonic acid, as colorless crystals, m.p. 107–107.5° C. (corr.).

Cyclopentenylbutanoic acid.

In a small flask fitted with a reflux condenser and stirrer, 7 grams of cyclopentenyl ethyl malonic acid is heated at about 150–155° C. until most of the carbon dioxide has been expelled; the material is then heated at about 165–170° C. for half an hour. The cyclopentenylbutyric acid so obtained boils at 125–126° C. (corr.) at 4 mm. pressure.

The scope of the invention should be determined by reference to the appended claims, said claims being construed as broadly as possible, consistent with the state of the art.

We claim as our invention:

1. New compounds of the formula

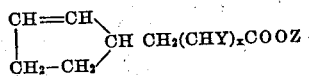

in which Y represents a monovalent atom or group, X represents one or more, and Z represents hydrogen or a substituted hydrogen, such as a metal or an alkyl group.

2. New compounds of the formula

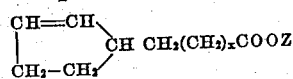

in which X represents one or more, and Z represents hydrogen or a substituted hydrogen such as a metallic element or alkyl.

ROGER ADAMS.
CARL R. NOLLER.
JAMES A. ARVIN.